W. H. GREEN.
TARGET.
APPLICATION FILED SEPT. 15, 1909.
950,101.
Patented Feb. 22, 1910.
4 SHEETS—SHEET 2.
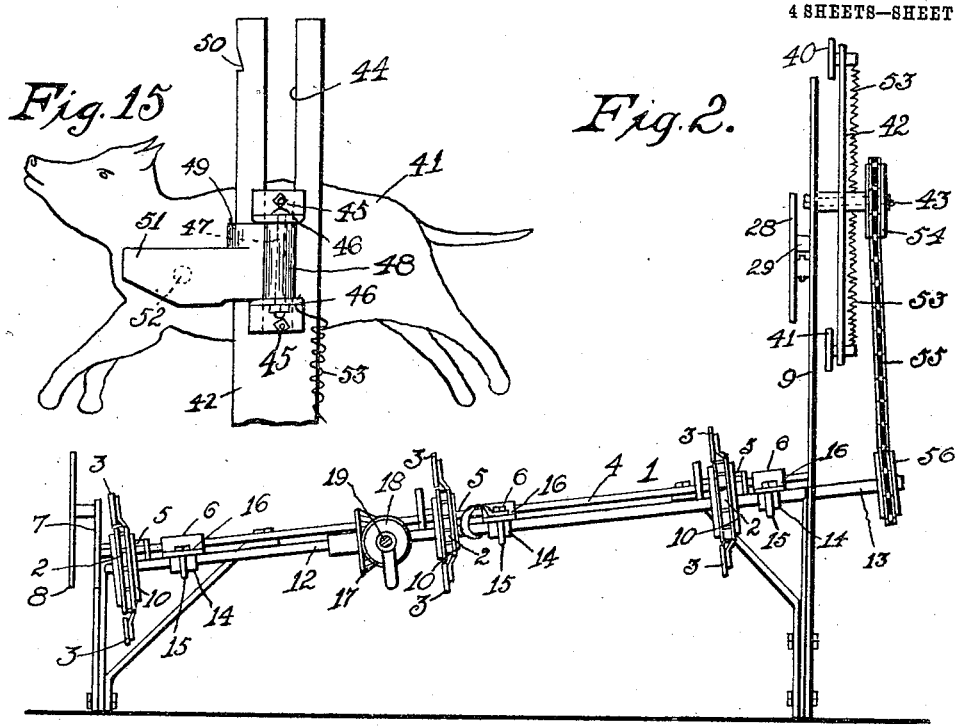
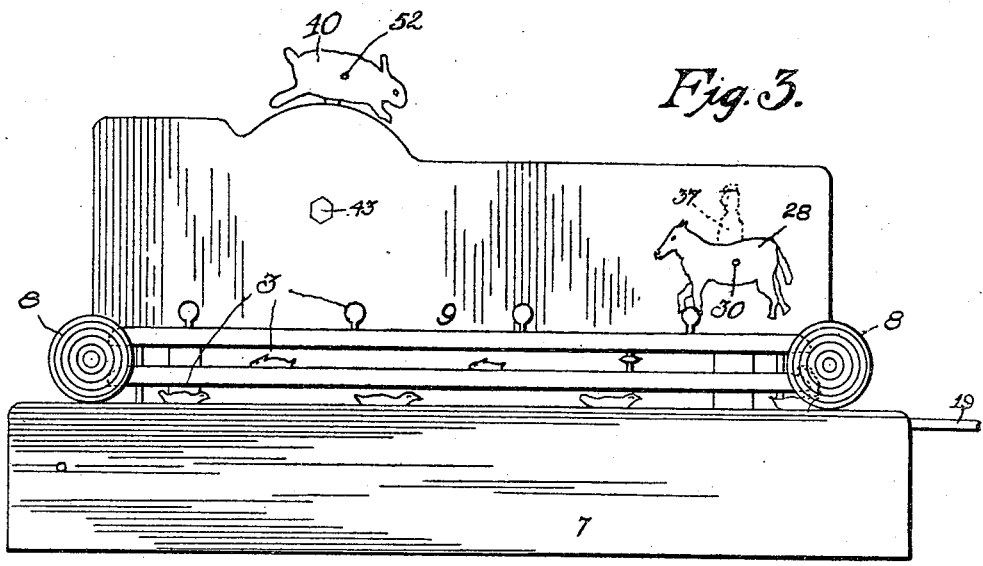
Witnesses
M. L. Brashears.
H. F. McQuay.
Inventor
William H. Green
By Watson E. Coleman
Attorney W. H. GREEN.
TARGET.
APPLICATION FILED SEPT. 15, 1909.
950,101.
Patented Feb. 22, 1910.
4 SHEETS—SHEET 3.
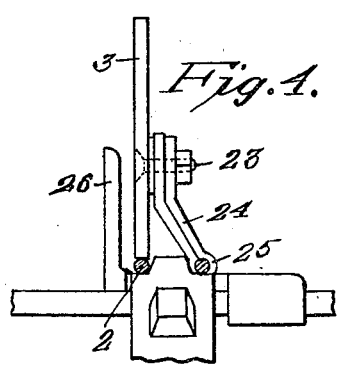
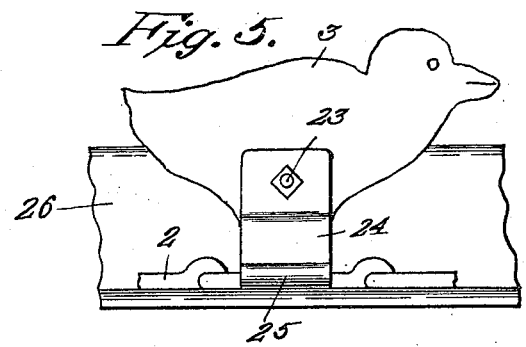
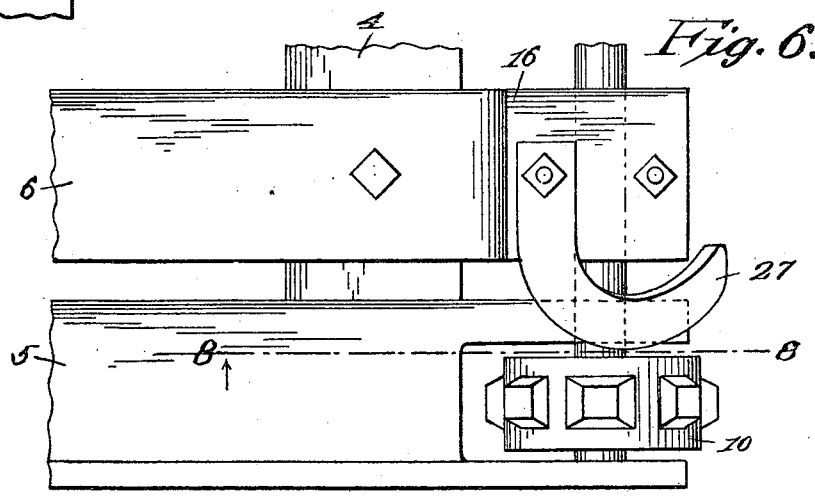
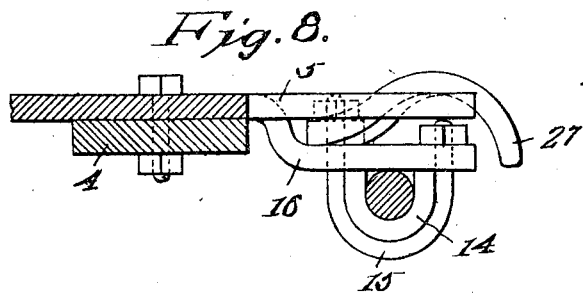
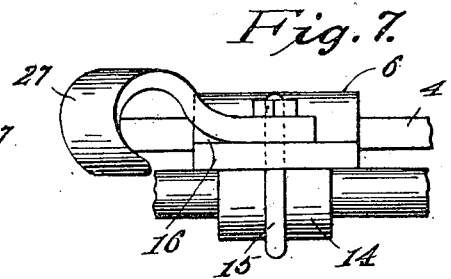
Witnesses
James F. Crown
H. F. McInay
Inventor
William H. Green
By Watson E. Coleman
Attorney

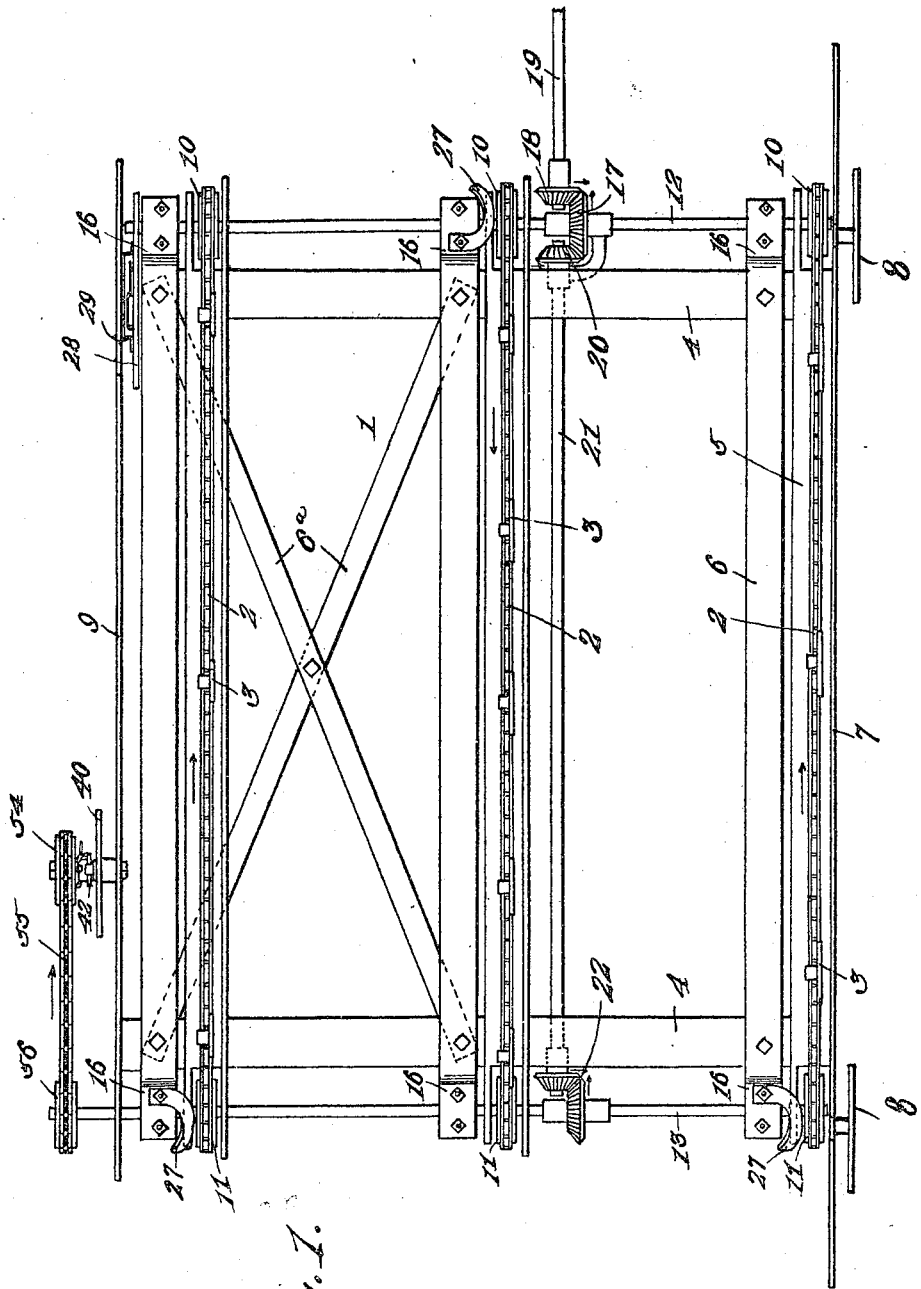

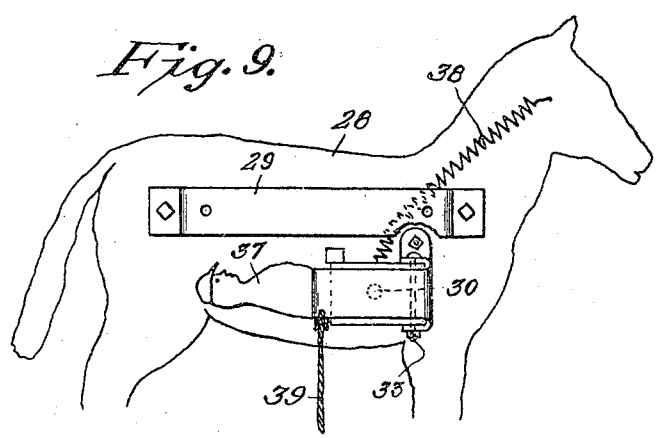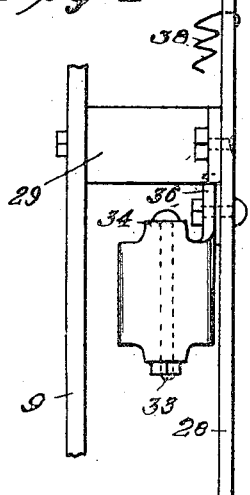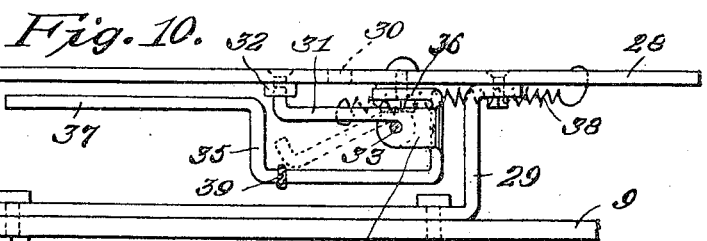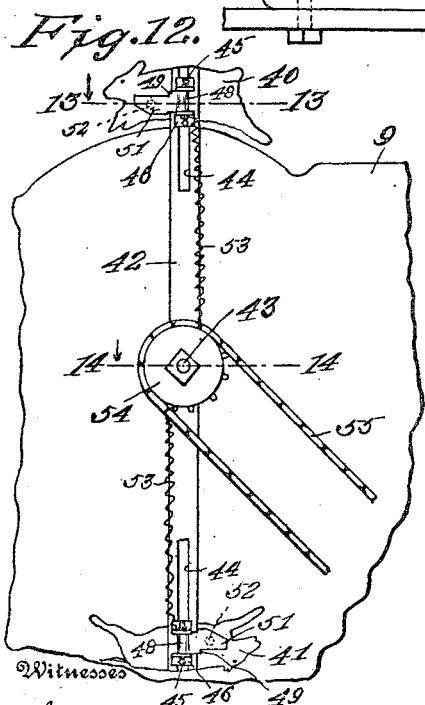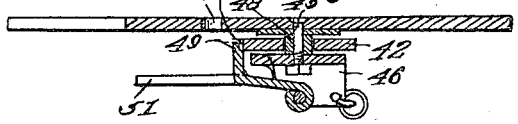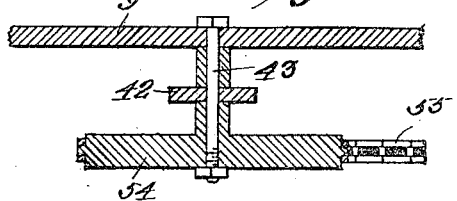

UNITED STATES PATENT OFFICE.

WILLIAM HENRY GREEN, OF THE DALLES, OREGON.

TARGET.

950,101.  Specification of Letters Patent.  Patented Feb. 22, 1910.

Application filed September 15, 1909. Serial No. 517,881.

*To all whom it may concern:*

Be it known that I, WILLIAM H. GREEN, a citizen of the United States, residing at The Dalles, in the county of Wasco and State of Oregon, have invented certain new and useful Improvements in Targets, of which the following is a specification, reference being had to the accompanying drawings.

This invention relates to improvements in targets of that class used in shooting galleries.

The object of the invention is to provide a simple and practical device of this character having constantly moving target figures which will drop when hit and which will be automatically restored to their upright position.

With the above and other objects in view, the invention consists of the novel features of construction and the combination and arrangement of parts hereinafter fully described and claimed, and illustrated in the accompanying drawings, in which—

Figure 1 is a plan view of the improved target device; Fig. 2 is an end view; Fig. 3 is a front elevation; Figs. 4 and 5 are enlarged end and rear views of one of the pivoted target figures and its co-acting parts; Fig. 6 is a detail plan view of a portion of the frame showing the cam for restoring the pivoted target figures to upright position; Fig. 7 is a detail end view of the parts shown in Fig. 6; Fig. 8 is a detail section taken on the plane indicated by the line 8—8 in Fig. 6; Fig. 9 is a rear elevation of another kind of target figure; Fig. 10 is an enlarged plan view of the parts shown in Fig. 9; Fig. 11 is an enlarged end view of the same; Fig. 12 is a rear view of another form of target figure; Figs. 13 and 14 are detail sectional views taken on the planes indicated by the lines 13—13 and 14—14 in Fig. 12; and Fig. 15 is an enlarged rear view of the trigger or catch shown in Fig. 13.

The invention comprises a suitable frame 1 for supporting one or more endless belts 2 which carry pivotally mounted target figures 3. The frame 1 preferably consists of two end bars 4 united by pairs of longitudinal bars 5, 6 and also by crossed diagonal braces 6ª. At the front of the frame is preferably arranged an upright plate 7 which hides from view the major portion of the frame 1 and on which may be arranged, if desired, the usual stationary circular targets 8. At the rear of the frame is an upright back plate 9 of greater height that the front plate.

In the present embodiment of the invention I have shown three of the endless belts 2 and they are preferably so driven that the intermediate one will travel in a direction opposite to that of the front and rear belts, as indicated by the arrows in Fig. 1. Each of these belts is in the form of a sprocket chain which passes around sprocket wheels 10, 11 arranged on two transverse or end shafts 12, 13. These shafts are journaled in U-shaped bearings 14 attached by means of U-bolts or clips 15 to the downwardly offset projecting ends 16 of the longitudinal bars 6, as shown more clearly in Figs. 7 and 8 of the drawings. The shaft 12 has fixed to it a beveled gear 17 which meshes with a similar gear or pinion 18 on a main drive shaft 19. The gear 17 also meshes with a beveled gear or pinion 20 on a longitudinal connecting shaft 21, the other end of which is connected to the shaft 13 by beveled gears 22. By reason of this gearing and by making the sprocket wheel 11 for the intermediate belt or chain 2 loose on the shaft 13 and the sprocket wheels 10 for the front and rear chains loose on the shaft 12, it will be seen that the chains will be actuated in the directions indicated by the arrows in Fig. 1.

The target figures 3 may be shaped to resemble birds, animals, ordinary circular targets, etc. and each is in the form of a plate having secured to its rear by means of a bolt or similar fastening 23 a two-part hanger arm 24, as shown more clearly in Figs. 4 and 5 of the drawings. The hanger 24 consists of two angular plates, the upper ends of which are held together against the rear face of the target figure or plate 3 by means of the bolt 23 and the lower ends of which are shaped to provide opposing pivot receiving seats 25 which receive as a pivot the side portion of one of the links of the chain 2. The hanger is so shaped and proportioned that when the target figure 3 is swung to an upright position its bottom edge will rest upon the opposing side portion of the chain link, as shown in Fig. 4, and when said target figure is struck by a bullet the impact will throw the figure rearwardly to a substantially horizontal position upon one of the longitudinal bars 6, which latter will support it as it moves across the frame. The upper stretch of each of the chains 2 travels over the horizontal portion of one of the longitudinal bars 5, which latter are preferably of angular shape in cross section so that their upstanding flanges 26 will partially hide the target figures 3 when the latter are upright and wholly hide them when they are knocked down. For the purpose of restoring the target figures 3 to their upright positions as they are brought above the bars 5, elevating cams 27 are provided. The latter are in the form of suitably curved metal straps having straight inner ends secured to certain of the offset ends 16 of the bar 6 by the U-bolts 15 and having their free ends curved longitudinally and extending beyond said ends 16 and forwardly over the ends of the bars 5 so that they will be in the path of the target figures 3 as the latter pass around the sprocket wheels and will elevate the same to upright position.

28 denotes a stationary target figure preferably in the form of a horse and secured by a U-shaped bracket 29 to the front face of the rear plate 9. Formed in this figure at approximately the position of the vital organs of the animal is an opening or bull's eye 30, in rear of which is a pivoted catch plate 31 adapted to be struck by a bullet passing through the opening 30. The catch 31 has a beveled end to engage a beveled keeper lug 32 upon the rear face of the plate 28 and its other end is bent upon itself to provide a pivot eye which receives a pivot bolt 33 arranged in opposing bearing ears 34 formed on an indicator plate 35. The latter has one of its ends pivoted at 36 to the rear face of the target 28 and its other end 37 is shaped to resemble the body and head of a horseback rider. This indicator figure 37 is held in horizontal retracted position shown in Fig. 9 by means of the catch 31 but when the latter is struck by a bullet and released from the keeper lug 32 a coil spring 38 attached to said latch swings the indicator figure 37 on the pivot 36 to an upright position so that the figure or rider appears above the horse. A retracting or resetting cord 39 is attached to the plate 35 and may pass around suitable guides and from thence to the front end of the shooting gallery so that the indicator may be lowered to its retracted position.

40, 41 denote two target figures preferably shaped to resemble a rabbit and dog and slidably mounted upon the ends of a constantly rotatable member or bar 42 which is mounted at its center on a horizontal shaft 43 so arranged in the rear plate 9 that said target figures 40, 41 may appear above the upper edge of said plate when said figures are held upon the extremities of said bar and the latter is rotated. The ends of the bar 42 are formed with guide slots 44 to receive bolts 45, which latter connect the target plates 40, 41 to angle plates 46. The latter are united by a pivot bolt 47 to a swinging catch plate 48, which latter has a catch or trigger projection 49 to engage a keeper notch 50 in the edge of one end of the bar 42. Said catch plate 48 is also provided with a portion or plate 51 disposed in rear of an opening or bull's eye 52 formed in one of the target figures. Coil springs 53 connect the innermost angle plates 46 of the slides to the hub of a sprocket wheel 54 rotatable on the shaft 43 and connected by a sprocket chain 55 to a sprocket wheel 56 fixed to the shaft 13. When the target figures 40, 41 are moved outwardly on the ends of the bars 42, the springs 53 will be stretched and said figures may be retained in said projected position by engaging the catch projections 49 with the notches 50. When the target figures are in this position they will appear above the upper edge of the plate 9 as the bar 42 rotates and when a bullet passes through one of the openings 52 and retracts the catch 48 the spring 53 which is connected to said figure will retract it so that it will not be exposed to view during the rotation of the bar 42.

Having thus described the invention what is claimed is:

1. In a target, the combination of a support, a pivot or shaft, a rotatably mounted bar upon the latter, target figures slidably arranged on the ends of said bar and having openings, catches disposed in rear of said openings and adapted to hold the figures in projected position on the extremities of said bar, springs for retracting said target figures when released by the catches and means for rotating said bar.

2. In a target, the combination of a support, a shielding member, a rotary member, a target mounted for radial sliding movement in said member, a spring for drawing the target inwardly, and a catch for holding the target on the outer portion of said member and against the tension of said spring whereby the target will project beyond said shielding member when the rotary member is rotated, said catch being adapted to be released by a bullet.

3. In a target, the combination of a rotatably mounted bar formed with a longitudinal slot and a keeper notch adjacent thereto, a target formed with an opening and having means slidably arranged in the slot in said bar, a swinging catch pivotally connected to the target and having a portion to engage said keeper notch, and a portion disposed in rear of the opening in said target, a coil spring connected to the target for moving it inwardly on the bar, and means for rotating said bar.

4. In a target, the combination of a frame having a longitudinal bar, a sprocket chain composed of pivotally connected rectangular links and having its upper stretch traveling over and supported by said longitudinal bar, guiding and driving means for said chain, a swinging target plate, a hanger for said target plate consisting of two angular straps formed at one end with opposing bearing recesses to receive the side bar of one of the links of the chain whereby the hanger may swing from the same, a fastening uniting the opposite ends of the hanger straps to the rear of the target plate whereby the lower edge of said plate will engage and be supported by the other side bar of the said chain link, and a cam adjacent one end of said longitudinal bar of the frame for swinging the target plate to an upright position as the upper stretch of the chain passes on to said bar.

5. In a target, the combination with a frame composed of pairs of longitudinal bars united by cross bars, the latter being arranged adjacent the ends of the longitudinal bars, the front bar of each of said pairs being of right angular shape in cross section and having a vertically disposed flange and a rearwardly projecting horizontal flange, the latter being formed at its ends with notches, the rear bar of each of said pairs having its ends downwardly offset, U-shaped bolts in said downwardly offset ends of the rear bar of each pair, U-shaped bearing straps in said bolts, shafts rotatably mounted in said bearing straps, cam members secured by said U-shaped bolts on the offset ends of the rear bars of said pairs, sprocket wheels fixed to said shafts and disposed in the recessed ends of the angle metal front bars, a sprocket chain passed around opposing sprocket wheels and having their upper stretches supported by the horizontal flanges of said angle metal front bars, pivotally mounted targets on said chains and adapted to engage and be actuated by said cam members, and means for driving said shaft.

6. In a target, the combination of a target plate formed with an opening, a beveled keeper lug on said plate adjacent the opening, a swinging member formed from a metal strap bent into rectangular shape and having one end formed with a pair of oppositely disposed ears and an intermediate ear pivoted to said target plate, the free end of said swinging member being extended and shaped to provide an indicating figure adapted to swing above said target plate, a pivot in said opposing ears on the swinging member, a latch plate mounted on said pivot to swing toward and from the target plate and having an angular free end adapted to engage said beveled keeper lug, a coil spring having one end anchored on the target plate, and its other end attached to said latch, whereby the latter will be swung toward the target plate, and the swinging member will be swung upwardly on its pivot to dispose the indicating figure above the target plate, and a resetting cord attached to said swinging member.

In testimony whereof I hereunto affix my signature in the presence of two witnesses.

WILLIAM HENRY GREEN.

Witnesses:
S. BOLTON,
L. B. FOX.